(12) United States Patent
Ma et al.

(10) Patent No.: US 11,809,133 B2
(45) Date of Patent: Nov. 7, 2023

(54) OPTO-MECHANICAL SYSTEM TO REMOVE ZEROTH ORDER DIFFRACTION IN PHASE-ONLY SPATIAL LIGHT MODULATOR

(71) Applicant: Thorlabs, Inc., Newton, NJ (US)

(72) Inventors: Hongzhou Ma, Centreville, VA (US); Jeffery S. Brooker, Manassas, VA (US)

(73) Assignee: Thorlabs, Inc., Newton, NJ (US)

( * ) Notice: Subject to any disclaimer, the term of this patent is extended or adjusted under 35 U.S.C. 154(b) by 36 days.

(21) Appl. No.: 17/578,961

(22) Filed: Jan. 19, 2022

(65) Prior Publication Data
US 2022/0229398 A1 Jul. 21, 2022

Related U.S. Application Data

(60) Provisional application No. 63/138,967, filed on Jan. 19, 2021.

(51) Int. Cl.
*G02B 26/06* (2006.01)
*G03H 1/22* (2006.01)
*G03H 1/08* (2006.01)

(52) U.S. Cl.
CPC ............. *G03H 1/2294* (2013.01); *G03H 1/08* (2013.01); *G03H 2222/12* (2013.01); *G03H 2223/13* (2013.01); *G03H 2223/19* (2013.01); *G03H 2223/24* (2013.01); *G03H 2225/32* (2013.01)

(58) Field of Classification Search
CPC .... G03H 1/2294; G03H 1/08; G03H 2222/12; G03H 2223/13; G03H 2223/19; G03H 2223/24; G03H 2225/32; H04N 9/3111; H04N 9/315

USPC ................................................... 353/38, 121
See application file for complete search history.

(56) References Cited

U.S. PATENT DOCUMENTS

| 5,982,553 A | 11/1999 | Bloom et al. |
| 6,480,634 B1 | 11/2002 | Corrigan |
| 2004/0109219 A1 | 6/2004 | Kikuchi |
| (Continued) | | |

FOREIGN PATENT DOCUMENTS

EP   3 528 058 A1   8/2019

OTHER PUBLICATIONS

The extended European search report with European search opinion issued by the European Patent Office for European Patent Application No. 22152039.8, dated Jun. 28, 2022.

*Primary Examiner* — Audrey Y Chang
(74) *Attorney, Agent, or Firm* — MYERS WOLIN, LLC

(57) ABSTRACT

An optical image generation system including: a spatial light modulator (SLM) configured to receive an input collimated laser beam and modulate the wavefront of the laser beam; one or more optical elements configured to project the modulated laser beam onto a focal plane; a first mirror and a second mirror situated at the focal plane, an edge of the first mirror being adjacent to an edge of the second mirror, the first mirror reflects a first portion of the modulated laser beam in a first direction, the second mirror reflects a second portion of the modulated laser beam in a second direction; and an objective lens projects the first and second portions into a combined image; wherein the zeroth order diffraction is block or suppressed at the center of the focal plane.

16 Claims, 3 Drawing Sheets

(56) References Cited

U.S. PATENT DOCUMENTS

| | | | |
|---|---|---|---|
| 2005/0073670 A1* | 4/2005 | Carroll | G03F 7/70341 355/77 |
| 2011/0002019 A1* | 1/2011 | Routley | H04N 9/3111 353/38 |
| 2016/0054648 A1* | 2/2016 | Read | G03B 21/28 353/121 |
| 2018/0039072 A1* | 2/2018 | Okumura | H04N 9/315 |

* cited by examiner

OPTO-MECHANICAL SYSTEM TO REMOVE ZEROTH ORDER DIFFRACTION IN PHASE-ONLY SPATIAL LIGHT MODULATOR

CROSS REFERENCE TO RELATED APPLICATIONS

This application claims the benefit of U.S. Provisional Patent Application No. 63/138,967 filed on Jan. 19, 2021. The contents of U.S. Provisional Patent Application 63/138,967 are hereby incorporated by reference.

FIELD OF THE INVENTION

The invention generally relates to optical systems that utilize hologram to generate two-dimensional optical images or two-dimensional optical patterns. More particularly, the invention relates to an opto-mechanical system to remove zeroth order diffraction in phase-only spatial light modulator.

BACKGROUND

Liquid crystal spatial light modulators (SLM) have been well accepted as a tool for dynamic optical wavefront modulation. The wavefront modulation can be used for non-mechanical beam steering, generating beamlets, image projection, optical pattern generation, or optical trapping. The holographic phase mask applied to the SLM is usually computer generated by Fourier transform of the target image or pattern. A lens or an optical system projects the wavefront phase modulated beam into the target image or pattern at the focal plane. In nature such wavefront modulation is based on diffraction of light. Since the liquid crystal SLM is pixelated in structure, in addition to the +/- first order diffraction, there is always non-negligible optical power in the residual zeroth order diffraction beam. The zeroth order beam propagates in the way of specular reflection from the SLM surface. Thus, after a lens or an optical system, the zeroth order beam focuses into a spot at the center of the focal plane together with the target image or pattern. There are usually three methods that can block or suppress the zeroth order diffraction.

1. Use a zeroth order blocker, usually a small dot made of metallic film, that is placed at the center of the focal plane thus to block the zeroth order spot. While it blocks the zeroth order diffraction, the area blocked by the zeroth order mask is not addressable by the holographic phase mask.
2. Use only half of the field of view of the holographic phase mask. This method can avoid the center residual zeroth order diffraction, yet it loses half of the field of view of the SLM.
3. In the holographic phase mask, apply spherical phase shift to each of the beamlets such that the image plane is shifted away from the focal plane. In this way at the plane of the image or pattern the zeroth order diffraction beam is defocused thus appears to be dimmer.

Therefore, there is long felt need for an inventive solution to overcome the problems that plague the existing methods discussed above.

SUMMARY

An embodiment of the present invention presents an opto-mechanical system that can block the zeroth order diffraction beam yet keep the central area of image plane addressable and utilize the full SLM field of view.

One embodiment of the present invention provides an optical image generation system including: a spatial light modulator (SLM) configured to receive an input collimated laser beam and phase-modulate the wavefront of the laser beam; one or more optical elements configured to project the modulated laser beam onto a focal plane; a first mirror and a second mirror situated at the focal plane, an edge of the first mirror being adjacent to an edge of the second mirror, the first mirror being configured to reflect a first portion of the modulated laser beam in a first direction, and the second mirror being configured to reflect a second portion of the modulated laser beam in a second direction; and a tube lens and an objective lens configured to project the first and second portions into a combined image; wherein the center of the focal plane falls in a gap between the edge of the first mirror and the edge of the second mirror, such that the zeroth order diffraction of the laser beam by the SLM is removed.

One embodiment of the present invention provides an optical image generation system including: a spatial light modulator (SLM) configured to receive an input collimated laser beam and modulate the wavefront of the laser beam; one or more optical elements configured to project the modulated laser beam onto a focal plane; a zeroth order block situated at the focal plane; a first mirror and a second mirror situated behind the zeroth order block, an edge of the first mirror being adjacent to an edge of the second mirror, the first mirror being configured to reflect a first portion of the modulated laser beam in a first direction, and the second mirror being configured to reflect a second portion of the modulated laser beam in a second direction; and a tube lens and an objective lens configured to project the first and second portions into a combined image; wherein the zeroth order block comprises an opaque stripe located at the center of the focal plane and the length of stripe is parallel to the edges of the first and second mirrors, such that the zeroth order diffraction of the laser beam by the SLM is blocked.

One embodiment of the present invention provides a method of generating an optical image including: receiving an input collimated laser beam and phase-modulating the wavefront of the laser beam by a spatial light modulator (SLM); projecting the modulated laser beam onto a focal plane by one or more optical elements; reflecting a first portion of the modulated laser beam in a first direction by a first mirror, and reflecting a second portion of the modulated laser beam in a second direction by a second mirror, the first mirror and second mirror being situated at the focal plane, an edge of the first mirror being adjacent to an edge of the second mirror; and projecting the first and second portions by a tube lens and an objective lens to form a combined image; wherein the center of the focal plane falls in a gap between the edge of the first mirror and the edge of the second mirror, such that the zeroth order diffraction of the laser beam by the SLM is removed.

One embodiment of the present invention provides a method of generating an optical image including: receiving an input collimated laser beam and phase-modulating the wavefront of the laser beam by a spatial light modulator (SLM); projecting the modulated laser beam onto a focal plane by one or more optical elements; situating a zeroth order block at the focal plane; reflecting a first portion of the modulated laser beam in a first direction by a first mirror, and reflecting a second portion of the modulated laser beam in a second direction by a second mirror, the first mirror and second mirror being situated behind the zeroth order block, an edge of the first mirror being adjacent to an edge of the second mirrors; and projecting the first and second portions by a tube lens and an objective lens to form a combined image; wherein the zeroth order block includes an opaque stripe located at the center of the focal plane and the length of stripe being parallel to the edges of the first and second mirrors, such that the zeroth order diffraction of the laser beam by the SLM is blocked.

DETAILED DESCRIPTION OF THE PREFERRED EMBODIMENTS

Figure 1:
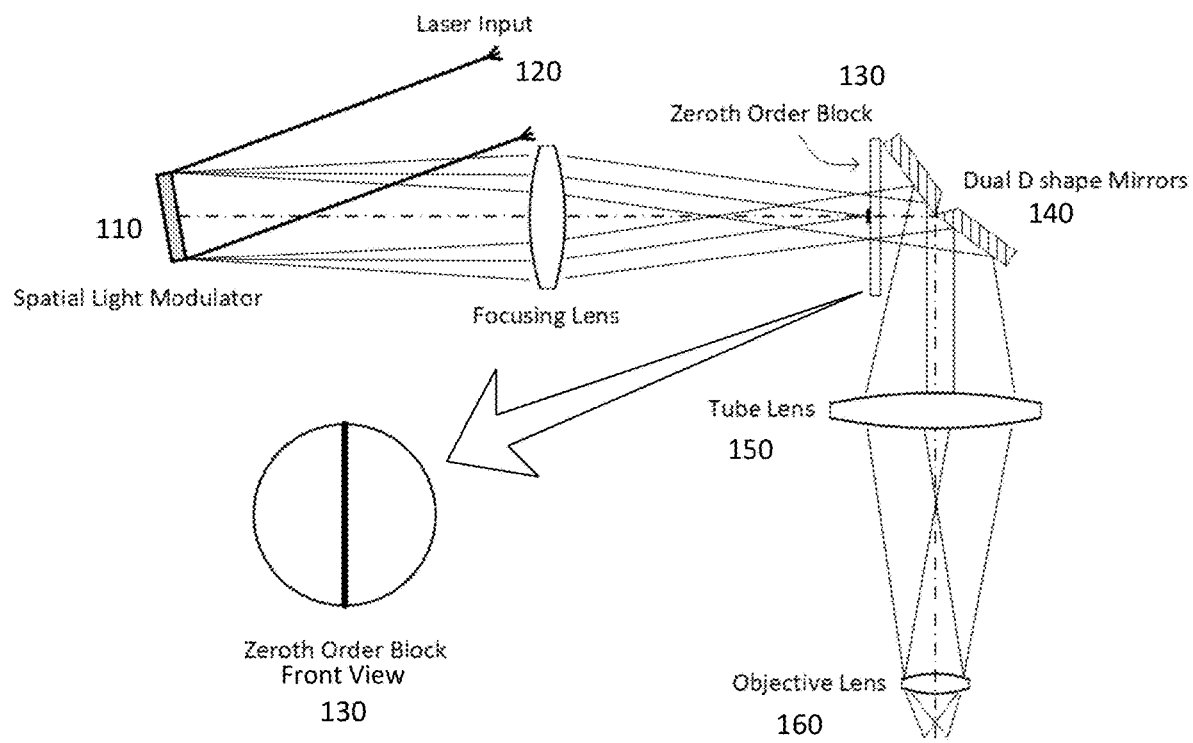
FIG. 1 shows an opto-mechanical system according to an embodiment of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 3:
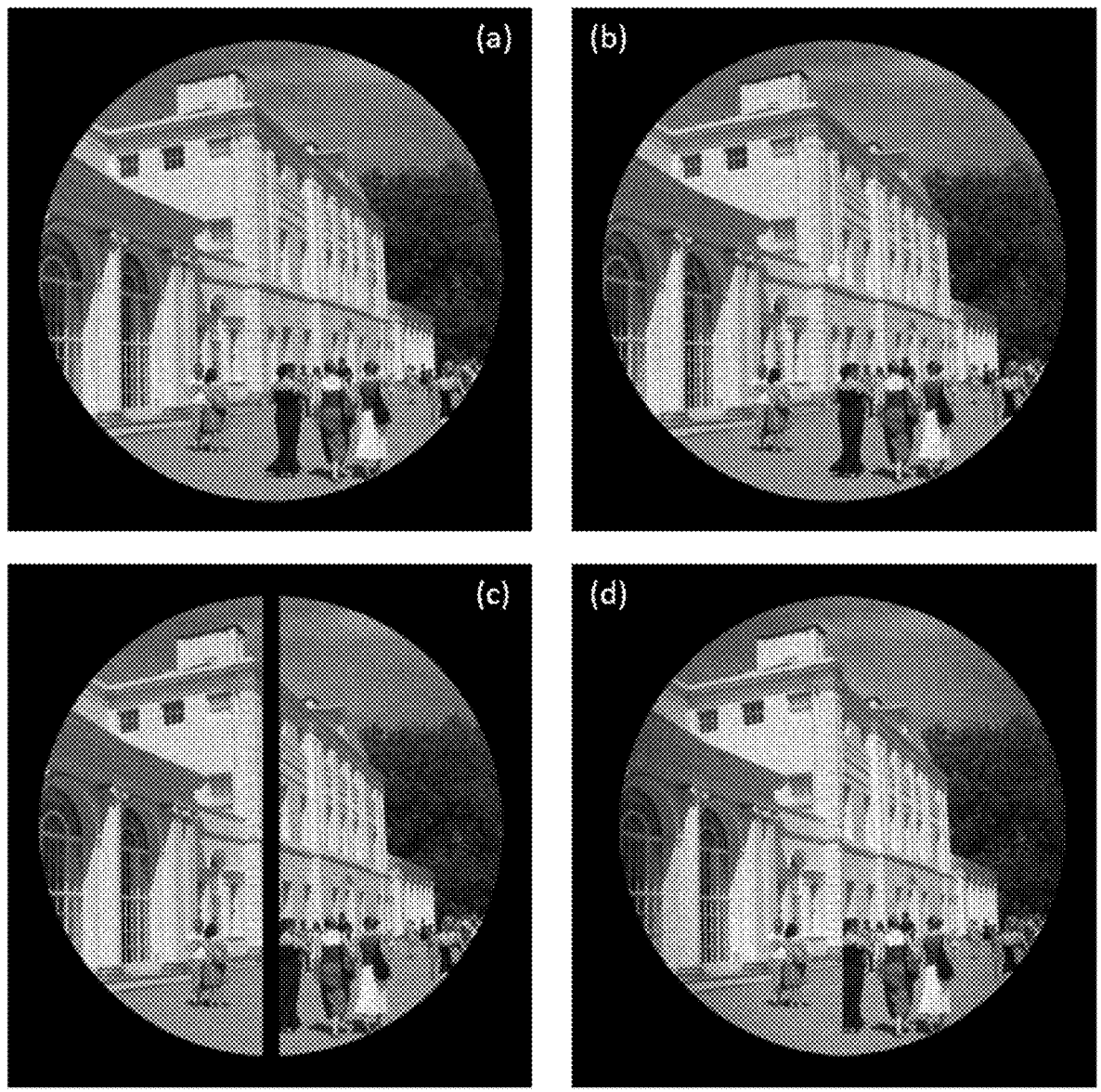
FIG. 3(a) shows an original image.
FIG. 3(b) shows an image projected by SLM that has a zeroth order spot at the center.
FIG. 3(c) shows a line obstruction masked the center spot also left a center gap.
FIG. 3(d) shows that the roof mirror with large apex angle shifts left and right parts of image to seal the gap according to an embodiment of the present invention.

In one embodiment a computer-generated hologram (CGH) is applied to the SLM 110 to act as an optical phase mask. As shown in FIG. 1, the phase mask phase-modulates the wavefront of input collimated laser beam 120. Due to the pixelated structure of SLM, there is always significant portion of input laser that is not affected by the phase mask. This portion of laser appears to be like the zeroth order beam from a diffraction grating. When viewed at an imaging plane, the zeroth order beam focuses into a bright dot in the center of the image, as shown in FIG. 3(b). At this imaging plane, a line obstruction 130 is inserted to block the zeroth order (An example front view of the zeroth order block is shown in FIG. 1 lower left). As shown in FIG. 3(c), the line obstruction can block the unwanted center dot; however, it also blocks a sub area of image and leaves a dark region in the center of image.

To recover the central dark region, in one embodiment, a roof mirror 140 is put right after the zeroth order block 130, as shown in FIG. 1. The roof mirror includes two non-parallel mirrors. The roof mirror 140 has a reflex angle such that it effectively shifts the left side of image to the right and right to the left. The reflections by the left and right sides of the roof mirror are projected by a tube lens 150 and an objective lens 160 to form a combined image. By using a proper reflex angle, the left and right sides of image merge at the center, as show in FIG. 3(d). As a result, a zeroth order dot free image with no dark region in the center is obtained.

Figure 2:
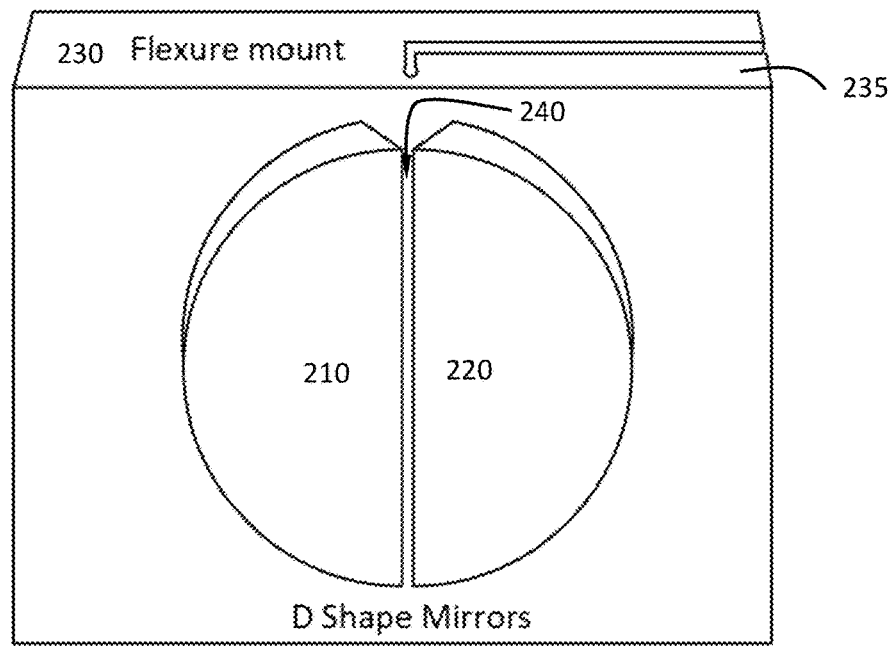
FIG. 2 shows the two D-shaped mirrors of an opto-mechanical system according to an embodiment of the present invention.

One embodiment provides a method to construct the required roof mirror with reflex angle. Two D shaped mirrors 210, 220 are affixed to a flexure mount 230 as shown in FIG. 2. Note that the two mirrors to create a roof mirror with circular do not have to be D shaped. The use of two D shaped mirrors is to make a roof mirror having a circular shape in one example embodiment. Other shapes for the roof mirror, such as square, rectangle, etc. are also contemplated. Nonlimiting examples of affixing means, such as glue, screws, braces, solder, etc., may be used to affix the mirrors to the flexure mount. In one embodiment, half of the flexure mount 235 can be adjusted with a fine threaded plunger. One can precisely adjust one D shape mirror with respect to the other until proper angle is achieved such that the central dark region is completely recovered. In another embodiment, both sides of the flexure mount are adjustable to allow for more flexibility and convenience in adjusting the angle between the two mirrors.

In another embodiment, the zeroth order block is not used. As can be seen from FIG. 2, in one embodiment, the roof mirror has a gap 240 between the edges of the two D shaped mirrors. Light falling into the gap will not be reflected by the roof mirror. In one embodiment, the roof mirror is placed at the focal plane, with the center of the focal plane falling in the gap between the edges of the two mirrors. In this arrangement, the zeroth order diffraction of the laser beam falls into the gap and thus is removed from the image output.

Image Transform

In one embodiment, the content of the central region of image can also be recovered. Since the CGH is computer generated, one can always pre-compensate in the original image the shifts due to the roof mirror. If an Affine transformation is modeled between the target image and the actual image, different translational values are needed for the left and right half of the original image. In general, the required Affine transformation matrix has the following form:

$$\begin{vmatrix} a_{11} & a_{12} & v_x \\ a_{21} & a_{22} & v_y \\ 0 & 0 & 1 \end{vmatrix}$$

where $a_{11}$, $a_{12}$, $a_{21}$ and $a_{22}$ are matrix elements of a linear map, and $v_x$ and $v_y$ are vector components of a translation.

If the line obstruction has a width of 2d, and image has a width of W, the new modified Affine transformation needs different matrices for the left and right parts of the image:

$$\begin{vmatrix} a_{11} & a_{12} & -d \\ a_{21} & a_{22} & v_y \\ 0 & 0 & 1 \end{vmatrix} \text{ for } x < W/2$$

$$\begin{vmatrix} a_{11} & a_{12} & d \\ a_{21} & a_{22} & v_y \\ 0 & 0 & 1 \end{vmatrix} \text{ for } x > W/2$$

Aberration

Figure 4:
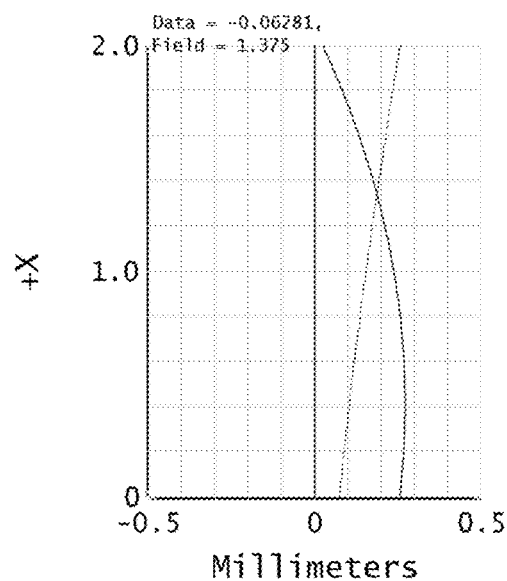
FIG. 4 shows the field curvature along the +x direction, which is orthogonal to the roof mirror fold angle according to an embodiment of the present invention.
Figure 5:
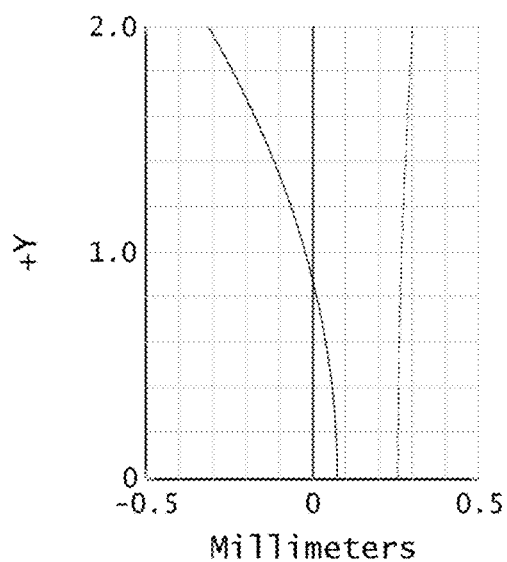
FIG. 5 shows the field curvature along the +y direction, which is along the fold angle of the roof mirror according to an embodiment of the present invention.

The reflex angle of the roof mirror introduces slight image tilts in both left and right part of image. FIG. 4 represents the field curvature along the +x direction, which is orthogonal to the roof mirror fold angle. FIG. 5 represents the field curvature along the +y direction, which is along the fold angle of the roof mirror. Maintaining small reflex angle is important such that the tilt of field is inside the Rayleigh range of the beam after the focusing lens.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An optical image generation system comprising:
   a spatial light modulator (SLM) configured to receive an input collimated laser beam and phase-modulate the wavefront of the laser beam;
   one or more optical elements configured to project the modulated laser beam onto a focal plane;
   a first mirror and a second mirror situated at the focal plane, an edge of the first mirror being adjacent to an edge of the second mirror, the first mirror being configured to reflect a first portion of the modulated laser beam in a first direction, and the second mirror being configured to reflect a second portion of the modulated laser beam in a second direction; and
   a tube lens and an objective lens configured to project the first and second portions into a combined image;
   wherein the center of the focal plane falls in a gap between the edge of the first mirror and the edge of the second mirror, such that the zeroth order diffraction of the laser beam by the SLM is removed;
   wherein a computer-generated hologram (CGH) is applied to the SLM to form an optical phase mask; and
   wherein the CGH is pre-compensated for shifts of image due to the first and second mirrors, wherein the pre-compensating comprises applying respective first and second affine transforms to the first and second portions, the first and second affine transforms being based on a width of the image and a width of the block or gap.

2. The optical image generation system of claim 1, wherein at least one of the first and second directions is adjustable.

3. The optical image generation system of claim 1, wherein the first and second mirrors are mounted on a flexure mount such that an angle between the first and second mirrors is adjustable.

4. The optical image generation system of claim 1, wherein the first and second mirrors are configured as dual D shaped mirrors.

5. An optical image generation system comprising:
   a spatial light modulator (SLM) configured to receive an input collimated laser beam and phase-modulate the wavefront of the laser beam;
   one or more optical elements configured to project the modulated laser beam onto a focal plane;
   a zeroth order block situated at the focal plane;
   a first mirror and a second mirror situated behind the zeroth order block, an edge of the first mirror being adjacent to an edge of the second mirror, the first mirror being configured to reflect a first portion of the modulated laser beam in a first direction, and the second mirror being configured to reflect a second portion of the modulated laser beam in a second direction; and
   a tube lens and an objective lens configured to project the first and second portions into a combined image;
   wherein the zeroth order block comprises an opaque stripe located at the center of the focal plane and the length of stripe is parallel to the edges of the first and second mirrors, such that the zeroth order diffraction of the laser beam by the SLM is blocked;
   wherein a computer-generated hologram (CGH) is applied to the SLM to form an optical phase mask; and
   wherein the CGH is pre-compensated for shifts of image due to the first and second mirrors, wherein the pre-compensating comprises applying respective first and second affine transforms to the first and second portions, the first and second affine transforms being based on a width of the image and a width of the block or gap.

6. The optical image generation system of claim 5, wherein at least one of the first and second directions is adjustable.

7. The optical image generation system of claim 5, wherein the first and second mirrors are mounted on a flexure mount such that an angle between the first and second mirrors is adjustable.

8. The optical image generation system of claim 5, wherein the first and second mirrors are configured as dual D shaped mirrors.

9. A method of generating an optical image comprising:
   receiving an input collimated laser beam and phase-modulating the wavefront of the laser beam by a spatial light modulator (SLM);
   projecting the modulated laser beam onto a focal plane by one or more optical elements;
   reflecting a first portion of the modulated laser beam in a first direction by a first mirror, and reflecting a second portion of the modulated laser beam in a second direction by a second mirror, the first mirror and second mirror being situated at the focal plane, an edge of the first mirror being adjacent to an edge of the second mirror; and projecting the first and second portions by a tube lens and an objective lens to form a combined image;

wherein the center of the focal plane falls in a gap between the edge of the first mirror and the edge of the second mirror, such that the zeroth order diffraction of the laser beam by the SLM is removed;

wherein a computer-generated hologram (CGH) is applied to the SLM to form an optical phase mask; and wherein the CGH is pre-compensated for shifts of image due to the first and second mirrors, wherein the pre-compensating comprises applying respective first and second affine transforms to the first and second portions, the first and second affine transforms being based on a width of the image and a width of the block or gap.

10. The method of claim 9, further comprising adjusting at least one of the first and second directions.

11. The method of claim 9, wherein the first and second mirrors are mounted on a flexure mount, and the method further comprises adjusting an angle between the first and second mirrors.

12. The method of claim 9, wherein the first and second mirrors are configured as dual D shaped mirrors.

13. A method of generating an optical image comprising:
receiving an input collimated laser beam and phase-modulating the wavefront of the laser beam by a spatial light modulator (SLM);

projecting the modulated laser beam onto a focal plane by one or more optical elements;

situating a zeroth order block at the focal plane;

reflecting a first portion of the modulated laser beam in a first direction by a first mirror, and reflecting a second portion of the modulated laser beam in a second direction by a second mirror, the first mirror and second mirror being situated behind the zeroth order block, an edge of the first mirror being adjacent to an edge of the second mirrors; and projecting the first and second portions by a tube lens and an objective lens to form a combined image;

wherein the zeroth order block comprises an opaque stripe located at the center of the focal plane and the length of stripe being parallel to the edges of the first and second mirrors, such that the zeroth order diffraction of the laser beam by the SLM is blocked;

wherein a computer-generated hologram (CGH) is applied to the SLM to form an optical phase mask; and wherein the CGH is pre-compensated for shifts of image due to the first and second mirrors, wherein the pre-compensating comprises applying respective first and second affine transforms to the first and second portions, the first and second affine transforms being based on a width of the image and a width of the block or gap.

14. The method of claim 13, further comprising adjusting at least one of the first and second directions.

15. The method of claim 13, wherein the first and second mirrors are mounted on a flexure mount, and the method further comprises adjusting an angle between the first and second mirrors.

16. The method of claim 13, wherein the first and second mirrors are configured as dual D shaped mirrors.

* * * * *